United States Patent
Sun et al.

(10) Patent No.: US 12,164,474 B2
(45) Date of Patent: Dec. 10, 2024

(54) METHOD FOR CONFIGURING PRIORITY LEVEL, CLOUD PLATFORM, SYSTEM, COMPUTING DEVICE, AND MEDIUM

(71) Applicant: Siemens Aktiengesellschaft, Munich (DE)

(72) Inventors: Wei Sun, Wuxi (CN); He Yu, Wuxi (CN); Wen Jing Zhou, Wuxi (CN); Li Wang, Beijing (CN); Hai Tao Zhang, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 231 days.

(21) Appl. No.: 17/631,946

(22) PCT Filed: Aug. 6, 2019

(86) PCT No.: PCT/CN2019/099475
§ 371 (c)(1),
(2) Date: Feb. 1, 2022

(87) PCT Pub. No.: WO2021/022486
PCT Pub. Date: Feb. 11, 2021

(65) Prior Publication Data
US 2022/0283990 A1  Sep. 8, 2022

(51) Int. Cl.
*G06F 16/14* (2019.01)
*H04L 67/1097* (2022.01)
(52) U.S. Cl.
CPC ........ *G06F 16/148* (2019.01); *H04L 67/1097* (2013.01)

(58) Field of Classification Search
None
See application file for complete search history.

(56) References Cited

U.S. PATENT DOCUMENTS

| | | |
|---|---|---|
| 2007/0143290 A1 | 6/2007 | Fujimoto et al. |
| 2013/0254320 A1 | 9/2013 | Bhalerao et al. |
| 2014/0047064 A1* | 2/2014 | Maturana ............ G06N 7/01 709/217 |
| 2014/0129688 A1 | 5/2014 | Asenjo |
| 2015/0281319 A1 | 10/2015 | Maturana et al. |

(Continued)

FOREIGN PATENT DOCUMENTS

| | | |
|---|---|---|
| CN | 1801819 A | 7/2006 |
| CN | 101022625 A | 8/2007 |

(Continued)

OTHER PUBLICATIONS

International Search Report PCT/ISA/210 for PCT/CN2019/099475 dated Aug. 6, 2019.

*Primary Examiner* — Amresh Singh
(74) *Attorney, Agent, or Firm* — Harness, Dickey & Pierce, P.L.C.

(57) ABSTRACT

The present disclosure relates to a method for configuring a priority level, a cloud platform, a system, a computing device, and a medium. The method for configuring a priority level for data on a cloud platform comprises determining the data type of received data; determining, according to the data type, a priority level specification used for describing a priority level of the received data; and calculating the priority level of the received data on the basis of the priority level specification of the received data.

17 Claims, 4 Drawing Sheets

(56) References Cited

U.S. PATENT DOCUMENTS

| | | | |
|---|---|---|---|
| 2015/0281356 A1 | 10/2015 | Maturana et al. | |
| 2016/0364269 A1* | 12/2016 | Wang | .................... G06F 9/4881 |
| 2017/0265215 A1 | 9/2017 | Chaudhuri et al. | |
| 2019/0050266 A1 | 2/2019 | Gupta | |

FOREIGN PATENT DOCUMENTS

| | | | | | |
|---|---|---|---|---|---|
| CN | 103368867 | A | | 10/2013 | |
| CN | 103685442 | A | | 3/2014 | |
| CN | 103957228 | A | | 7/2014 | |
| CN | 104950837 | A | | 9/2015 | |
| CN | 104954242 | A | | 9/2015 | |
| CN | 106600446 | A | | 4/2017 | |
| CN | 107182090 | A | | 9/2017 | |
| CN | 108021619 | A | | 5/2018 | |
| CN | 108076156 | A | * | 5/2018 | ........... H04L 41/044 |
| CN | 109639591 | A | | 4/2019 | |
| CN | 109783202 | A | | 5/2019 | |
| CN | 109976885 | A | | 7/2019 | |
| EP | 3217753 | A1 | | 9/2017 | |

\* cited by examiner

METHOD FOR CONFIGURING PRIORITY LEVEL, CLOUD PLATFORM, SYSTEM, COMPUTING DEVICE, AND MEDIUM

PRIORITY STATEMENT

This application is the national phase under 35 U.S.C. § 371 of PCT International Application No. PCT/CN2019/099475 which has an International filing date of Aug. 6, 2019, which designated the United States of America, the entire contents of which are hereby incorporated herein by reference.

FIELD

Example embodiments of the present disclosure generally relate to the field of Internet of Things technologies, such as a method for configuring a priority, a cloud platform, a system, a computing device, and a medium.

BACKGROUND

With the rapid development of industrial cloud, an increasing number of devices are connected to the cloud. Based on the solutions on a cloud platform and an Internet of Things (IoT) platform, a field device may be monitored, such that a remote monitoring system becomes more convenient. It is desirable that some values are computed or predicted based on resources on the cloud/IoT platform, to send results back to the field and improve an industrial process. For example, accurate and predicted events may directly be sent to the field device and applications. Therefore, there may be a great number of critical and time-sensitive key events. However, a problem to be solved is how to ensure that an important event is sent to the field within an acceptable and reasonable period of time when cloud resources and bandwidths are limited.

One method to solve the problem is to mark each event with a priority in a cloud application (App).

SUMMARY

A brief summary of example embodiments of the present invention is given below to provide a basic understanding of some example embodiments of the present invention. It should be understood that the summary is not an exhaustive summary of the present invention. The summary is neither intended to determine the key or important part of the present invention, nor to limit the scope of the present invention. The object thereof is merely to give some concepts in a simplified form, as a prelude to the more detailed description presented later.

For events such as a relatively high electric current and anomalous vibration extracted and analyzed based on a great amount of original data, each App using data on the cloud needs to mark a priority one by one, which is a very time-consuming and labor-intensive task, and each application needs to repeat the operation.

In addition, for an App running on the cloud, it is difficult to mark priorities very fast. Although being good at some advanced algorithms, an App developer may hardly know an urgency degree of an event.

In view of the foregoing, the present disclosure proposes a method for automatic computing, on a cloud platform, of a priority of received data. In this method, when original data of the field is acquired, a descriptive priority description is used to mark each type of event rather than assigning a fixed value to a priority of the data. Then, a real-time priority of each piece of data may be computed based on the original data with the priority description.

According to an example embodiment of the present disclosure, a method for configuring a data priority on a cloud platform is provided, the method including: determining a data type of received data; determining, based on the data type, a priority description used to describe a priority of the data; and computing the priority of the data based on the priority description of the data.

Optionally, in an example embodiment, the determining, based on the data type, of a priority description used to describe a priority of the data includes: searching a configuration file stored on the cloud platform for the priority description corresponding to the data type, where the configuration file includes the data type and the priority description corresponding to the data type.

Optionally, in an example embodiment, the configuration file further includes a priority type corresponding to the data type, and the priority type includes a fixed priority, a conditional priority, and a combined priority.

Optionally, in an example embodiment, the data includes data acquired by field devices in different scenarios and uploaded to the cloud platform, and the configuration file includes different configuration files set for the different scenarios.

Optionally, in an example embodiment, the different scenarios include one or more of device information of a factory, order information of a factory, a production status of a factory, and a driverless car.

According to another example embodiment of the present disclosure, a cloud platform is provided, the cloud platform including: a data receiving unit configured to receive data and determine a data type of the received data; a priority description unit configured to determine, based on the data type, a priority description used to describe a priority of the data; and a priority computing unit configured to compute the priority of the data based on the priority description of the data.

Optionally, in an example embodiment, the cloud platform further includes: a configuration file storage unit, where the configuration file storage unit stores a configuration file, and the configuration file includes the data type and the priority description corresponding to the data type, where the priority description unit is further configured to: search the configuration file for the priority description corresponding to the data type.

Optionally, in an example embodiment, the configuration file further includes a priority type corresponding to the data type, and the priority type includes a fixed priority, a conditional priority, and a combined priority.

Optionally, in an example embodiment, the data includes data acquired by field devices in different scenarios and uploaded to the cloud platform, and the configuration file includes different configuration files set for the different scenarios.

Optionally, in an example embodiment, the different scenarios include one or more of device information of a factory, order information of a factory, a production status of a factory, and a driverless car.

According to another example embodiment of the present disclosure, an information processing system is provided, the information processing system including: at least one field device and a cloud platform, where the field device acquires field data, and uploads the data to the cloud platform, where the cloud platform uses the foregoing method to configure a priority of the data.

Optionally, in an example embodiment, the cloud platform is further configured to: deliver, based on the priority configured for the data, an event extracted from the data to the field device.

According to another example embodiment of the present disclosure, a computing device is provided, the computing device including: at least one processor; and a memory coupled to the at least one processor and configured to store instructions that, when executed by the at least one processor, cause the processor to perform the method described above.

According to another example embodiment of the present disclosure, a non-transitory machine readable storage medium is provided, which stores executable instructions that, when executed, cause the machine to perform the method described above.

According to another example embodiment of the present disclosure, a computer program is provided, the computer program including computer executable instructions that, when executed, cause at least one processor to perform the method described above.

According to another example embodiment of the present disclosure, a computer program product is provided, which is tangibly stored in a computer-readable medium and includes computer executable instructions that, when executed, cause at least one processor to perform the method described above.

According to the method and the system in the present disclosure, a dynamic priority instead of a fixed value is provided, such that different priorities can be configured for different events and combinations of events.

By using the method and the system in the present disclosure, all applications (Apps) using uploaded data on the cloud platform can obtain a priority value for the data, without separately marking a priority. In addition, for an event of a high priority, a fast channel may be selected and more resources may be allocated to ensure that the urgent event is sent to the field fast.

By using the method and the system in the present disclosure, it is not necessary for each application to configure a priority, such that resources can be saved.

By using the method and the system in the present disclosure, different transmission bandwidths can be set for events of different priorities, such that a waste of resources can be prevented and costs are reduced while it is ensured that an urgent event is delivered fast.

BRIEF DESCRIPTION OF THE DRAWINGS

The foregoing and other objectives, features, and advantages of example embodiments of the present invention can be more easily understood with reference to the following descriptions of example embodiments of the present invention in conjunction with the accompanying drawings. Components in the accompanying drawings are merely for illustrating example embodiments of the present invention. In the accompanying drawings, same or similar technical features or components are represented by using same or similar reference signs.

| Reference signs | |
|---|---|
| 100: | Method for configuring a data priority on a cloud platform |
| S102, S104, and S106: | Steps |
| 200: | Cloud platform |
| 202: | Data receiving unit |
| 204: | Priority description unit |
| 206: | Priority computing unit |
| 208: | Configuration file storage unit |
| 300: | Information processing system |
| 302: | Field device |
| 400: | Computing device |
| 402: | Processor |
| 404: | Memory |

DETAILED DESCRIPTION OF EMBODIMENTS

The subject matter described herein will now be discussed with reference to exemplary embodiments. It should be understood that the discussion of the embodiments is merely intended to enable those skilled in the art to better understand and realize the subject matter described herein, but not to limit the protection scope, applicability or examples set forth in the claims. The functions and arrangement of the discussed elements can be changed without departing from the protection scope of the present disclosure. Various processes or assemblies can be omitted, replaced, or added in various examples as needed. For example, the described method can be performed in an order different from the described order, and the steps can be added, omitted, or combined. In addition, the features described with respect to some examples can also be combined in other examples.

As used herein, the term "include/comprise" and the variations thereof denote an open term, which means "include/comprise but not limited to". The term "based on" denotes "at least partially based on". The terms "an embodiment" and "one embodiment" denote "at least one embodiment". The term "another embodiment" denotes "at least one another embodiment". The terms "first", "second", etc. may refer to different or the same objects. Other definitions, whether explicit or implicit, can be contained below. Unless explicitly specified in the context, the definition of a term is consistent throughout the description.

In consideration of the problem in the prior art, the present disclosure proposes a method for automatic computing, on a cloud platform, of a priority of received data. In this method, when original data of the field is acquired, a descriptive priority description is used to mark each type of event rather than assigning a fixed value to a priority of the data. Then, a real-time priority of each piece of data may be computed based on the original data with the priority description.

A method for configuring a data priority on a cloud platform and the cloud platform according to the embodiments of the present disclosure are described now in conjunction with the accompanying drawings.

Figure 1:
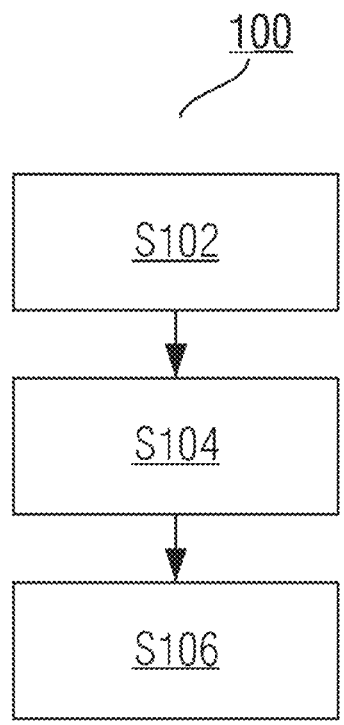
FIG. 1 is a flowchart showing an exemplary process of a method for configuring a data priority on a cloud platform according to an embodiment of the present disclosure.

FIG. 1 is a flowchart showing an exemplary process of a method 100 for configuring a data priority on a cloud platform according to an embodiment of the present disclosure.

In FIG. 1, first, in block S102, a data type of received data is determined.

In an example, the data received by the cloud platform may be data acquired by field devices in different scenarios and uploaded to the cloud platform. For example, the data may include device data uploaded from a factory, order data, production status data of the factory, car driving data uploaded from a driverless car, etc.

Those skilled in the art can understand that there are various scenarios at present in which data can be uploaded to a cloud platform, and data uploaded from any scenario can be processed based on the method in the present disclosure. The scenario is not limited in the present disclosure.

There may be different types of uploaded data. For example, the following Table 1 gives an example of a type of data uploaded at a machine tool in a factory, where the data type may include: an alarm, a vibration, a spindle current, that an operator is not at a workstation, a spindle current and that an operator is not at a workstation, and a spindle current and maintenance.

It can be learned that in the method for configuring a priority in the present disclosure, a priority can be configured for one type of data, and a priority can also be configured for a combination of two or more types of data.

Then, in block S104, a priority description used to describe a priority of the data is determined based on the data type.

In the method for configuring a priority in the present disclosure, instead of a static priority, the priority description used to describe the priority of the data that is determined based on the data type is allocated to the data.

For different data types, the priority description may be a fixed value, or may be a conditional expression. Different equations are used to compute a priority under different conditions. Alternatively, two or more types of data may be combined, where a priority is computed based on each data type.

In an example, the data type and the corresponding priority description used to describe the priority of the data may be stored in one configuration file, and then the configuration file is searched for the priority description corresponding to the data based on the data type.

As mentioned above, data may be uploaded from different scenarios, and data uploaded from the different scenarios may be of different data types. Therefore, different configuration files may be set for the different scenarios.

In an example, the configuration file may further include a priority type corresponding to the data type in addition to the data type and the corresponding priority description, and the priority type may include, for example, a fixed priority, a conditional priority, and a combined priority.

Those skilled in the art can understand that the priority type is used for convenient search or configuration of the corresponding priority description with respect to the data type, and is not a required item in the configuration file. The foregoing priority type is merely an example for description, and the present disclosure is not limited to the priority type.

When the method in the present disclosure is applied, different configuration files may be preset for different scenarios and stored on the cloud platform as needed. Then, for one of the scenarios, corresponding priority descriptions for different data types are searched for.

Finally, in block S106, the priority of the data is computed based on the priority description of the data.

Specifically, when the priority description is a fixed value, the priority does not need to be computed; when the priority description is a conditional expression, the priority is computed by using different equations under different conditions; or when two or more types of data are combined, depending on data types, there may be addition or subtraction of priorities, or a lower or higher priority in a plurality of priorities may be selected.

Through the foregoing process, the priority of the received data can be computed dynamically on the cloud platform.

A specific example of data priority configuration when the cloud platform receives data uploaded from a machine tool is provided below.

TABLE 1

| Data type | Priority description | Priority type |
|---|---|---|
| Alarm | Priority: 2 | Fixed priority |
| Vibration | Priority: 3 | Fixed priority |
| Spindle current | Priority: 5 | Fixed priority |
| Idle | If an idle time <5 minutes, a priority = 3; or if the idle time >5 minutes, the priority = the idle time − 3 | Conditional priority |
| That an operator is not at a workstation | If a time <5 minutes, a priority = 2; or if the time >5 minutes, the priority = the time − 2 | Conditional priority |
| Spindle current and that an operator is not at a workstation | If the two conditions are both satisfied, the priority = a priority 1 + a priority 2 = 7 | Combined priority |
| Spindle current and maintenance | If the two conditions are both satisfied, the priority = min(the priority 1, the priority 2) = 1 | Combined priority |

Table 1 is an exemplary configuration file for data uploaded from a machine tool in a factory to a cloud platform.

Data types in the configuration file include an alarm, a vibration, a spindle current, that an operator is not at a workstation, a spindle current and that an operator is not at a workstation, and a spindle current and maintenance. There are corresponding priority descriptions and priority types for the different types of data types.

Priority types in the configuration file in Table 1 include a fixed priority, a conditional priority, and a combined priority.

The fixed priority indicates that the data (or an event extracted from the data) has a fixed priority value.

In the present disclosure, a priority may be configured for data received by the cloud platform, or a priority may be configured for an event extracted from the data. A corresponding event can be extracted from data in the prior art, and therefore, data and an event are not distinguished in the present disclosure.

The conditional priority indicates that the data has different priority values in different cases.

The combined priority indicates that when there are a number of events happening at a same moment, a priority value of a priority is computed based on a priority value of each of the number of events.

Based on a priority description corresponding to each data type, a priority for the data type can be computed.

How to configure priorities for different types of data is described below for several specific cases.

Example 1: Configuration for a Vibration Event

If there is an anomaly in vibration data after analysis, a fixed priority value 3 is allocated to the event.

| a) | Original data: vibration |
| b) | A type is selected in a configuration file: fixed priority |
| c) | A priority value is set: The priority = 3 |

Example 2: Configuration for an Idle Event

If original data indicates that a time period when a machine tool is in an idle state is less than five minutes, a priority value is set to 2, but if the idle time is greater than five minutes, a priority value increases as the time period becomes longer. For example, if the idle time is greater than five minutes, a priority may be set to: the idle time−2.

| a) | Original data: idle |
| b) | A type is selected in a configuration file: conditional priority |
| c) | A condition 1 is set: The idle time <5, and then the priority = 2 |
| d) | A condition 2 is set: The idle time >5, and then the priority = the idle time − 2 |

Example 3: Configuration for Two Events

When a shaft current is higher than a normal value, and an operator is not at a workstation, it will be a highly urgent case. In this case, priority values of the two events are added, such that a priority can be raised to 7.

| a) | Original data: spindle current/status of an operator |
| b) | A type is selected: combined priority |
| c) | A rule is set: The priority = a priority 1 + a priority 2 |

Example 4: Another Case Partly the Same as the Example 3

When the spindle current is relatively high, but a machine tool is under maintenance, priority values of two events may be averaged, or a priority value that is smaller in the priority values of the two events is selected as a combined priority, because in this case, an operator may be repairing and debugging the machine tool.

| a) | Original data: shaft current/maintenance |
| b) | A type is selected: combined priority |
| c) | A rule is set: The priority = min(the priority 1, the priority 2). |

In this example, a larger priority value indicates a higher urgency degree of an event.

In the foregoing several examples, how to dynamically determine a priority of an event happening at a machine tool for data uploaded from the machine tool is described. These examples are merely examples for description. Those skilled in the art can understand that for different field devices in different scenarios, the method in the present disclosure may be used, to dynamically determine a real-time priority of an event happening at a field device.

According to the method in the present disclosure, a dynamic priority instead of a fixed value is provided, such that different priorities can be configured for different events and combinations of events.

According to the method in the present disclosure, all applications (Apps) using uploaded data on the cloud platform can obtain a priority value for the data, without separately marking a priority. In addition, for an event of a high priority, a fast channel may be selected and more resources may be allocated to ensure that the urgent event is sent to the field fast.

According to the method in the present disclosure, it is not necessary for each application to configure a priority, such that resources can be saved.

Different transmission bandwidths can be set for events of different priorities, such that a waste of resources can be prevented and costs are reduced while it is ensured that an urgent event is delivered fast.

Figure 2:
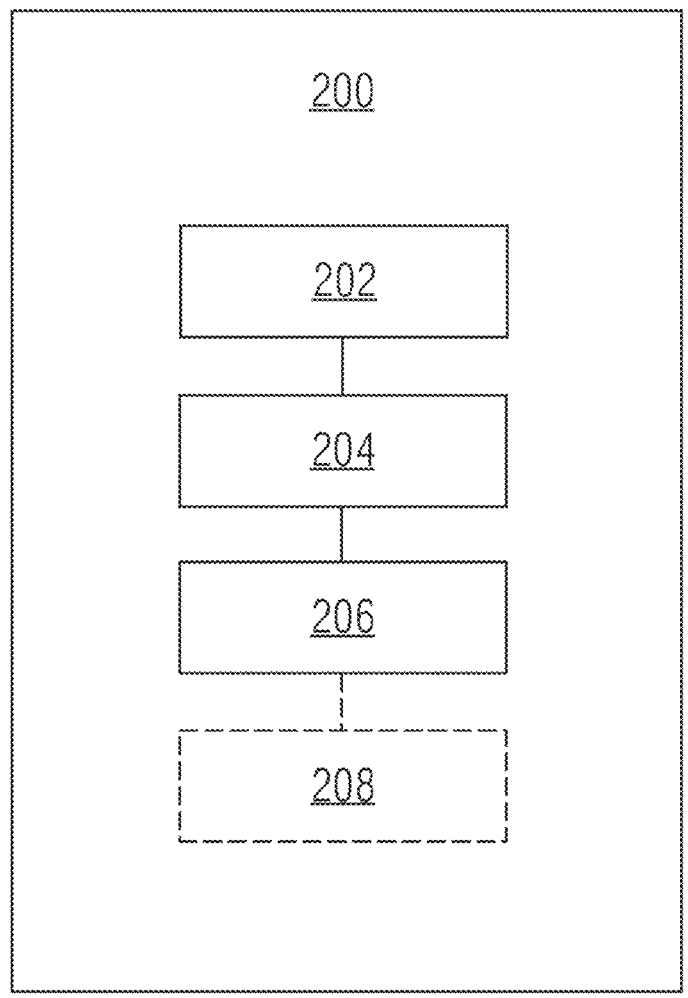
FIG. 2 is a block diagram showing an exemplary configuration of a cloud platform 200 according to an embodiment of the present disclosure.

FIG. 2 is a block diagram showing an exemplary configuration of a cloud platform 200 according to an embodiment of the present disclosure.

The cloud platform 200 includes: a data receiving unit 202, a priority description unit 204, and a priority computing unit 206.

The data receiving unit 202 is configured to receive data and determine a data type of the received data.

If original data needs to be processed, the data receiving unit 202 may first preprocess the data. In this case, the data receiving unit 202 may include a basic computing module, and may be extended to include another computing module or an analytic function library.

In addition, the data receiving unit 202 may further include a data extraction module configured to extract data from different data sources.

For different data sources, the cloud platform may use a proxy as a connection instance for communication management, for example, a field network management or system/application (App) interface. In addition, an adapter may be further used to support an instance communication protocol, to ensure that the data receiving unit 202 can obtain information about original data. For example, HTTP/HTTPS, OPC UA (OPC Unified Architecture), or other protocols may be used.

The priority description unit 204 is configured to determine, based on the data type, a priority description used to describe a priority of the data.

The priority computing unit 206 is configured to compute the priority of the data based on the priority description of the data.

The cloud platform 200 may further include: a configuration file storage unit 208, where the configuration file storage unit 208 stores a configuration file, and the configuration file includes the data type and the priority description corresponding to the data type, where the priority description unit 204 is further configured to: search the configuration file for the priority description corresponding to the data type.

The configuration file may further include a priority type corresponding to the data type, and the priority type may include a fixed priority, a conditional priority, a combined priority, etc.

The data includes data acquired by field devices in different scenarios and uploaded to the cloud platform, and the configuration file includes different configuration files set for the different scenarios.

The different scenarios may include one or more of device information of a factory, order information of a factory, a production status of a factory, and a driverless car.

It should be noted herein that the foregoing priority types and scenarios are merely examples for description, and the present disclosure is not limited to these priority types and scenarios.

It should be further noted that the cloud platform 200 and a structure of constituent units of the cloud platform shown in FIG. 2 are merely examples, and those skilled in the art may modify the structural block diagram of FIG. 2 as needed.

Figure 3:
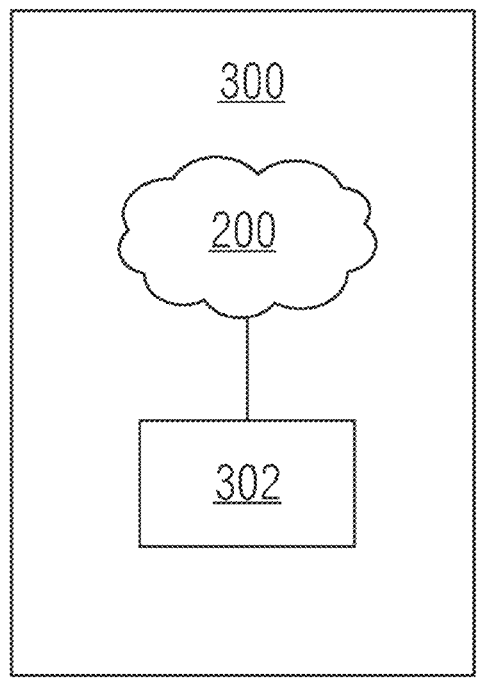
FIG. 3 is a block diagram showing an exemplary configuration of an information processing system 300 according to an embodiment of the present disclosure.

FIG. 3 is a block diagram showing an exemplary configuration of an information processing system 300 according to an embodiment of the present disclosure.

The information processing system 300 includes at least one field device 302 and a cloud platform 200.

The field device 302 acquires field data and uploads the data to the cloud platform 200.

After receiving the uploaded data, the cloud platform 200 uses the foregoing method for configuring a data priority with reference to FIG. 1 to configure a priority of the data.

Further, the cloud platform 200 delivers, based on a priority configured for each piece of data, an event extracted from the data to a field device.

As described above, an event can be extracted from data in the prior art. A time, a bandwidth, etc. for delivering the event extracted from the data to a field device may be determined based on the priority of each piece of data.

For example, the cloud platform may receive a plurality of pieces of data at the same time. Data configured with a high priority indicates a relatively urgent event, and an event extracted from the data is given priority to be delivered to the field device. For data configured with a low priority, delivery may be performed after an event of a high priority is delivered. In addition, different transmission bandwidths may be set for events of different priorities. A relatively large bandwidth is set for an event of a high priority; otherwise, a relatively small bandwidth is set, such that a waste of resources can be avoided.

In an example, the cloud platform may sort a priority score computed for each piece of data, and extract a required data result and a priority order, to organize a message/data queue to deliver the queue to the field device through a data pipeline. Herein, the data pipeline means a data transmission channel used for other services/Apps to submit an event or a notification. The services/Apps do not need to mark or encode each event with a priority, but only need to receive an event or a message queue.

As described above, with reference to FIGS. 1 to 3, the embodiments of the method for configuring a data priority on a cloud platform, the cloud platform, and the information processing system according to the embodiments of the present disclosure are described. The foregoing cloud platform may be implemented by hardware, or may be implemented by software or a combination of hardware and software.

Figure 4:
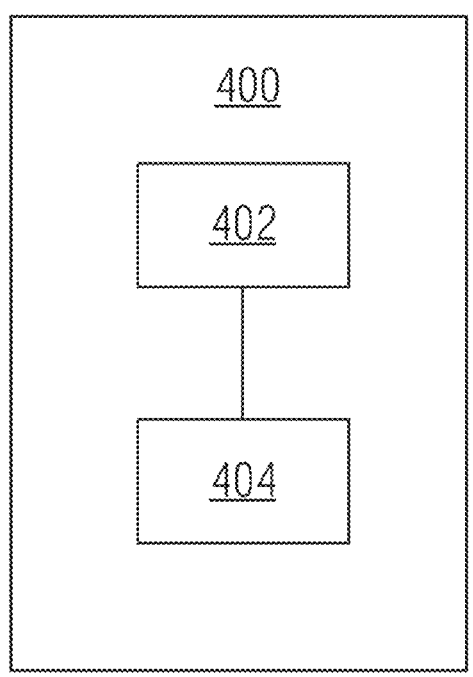
FIG. 4 is a block diagram showing a computing device for data priority configuration according to an embodiment of the present disclosure.

FIG. 4 is a block diagram showing a computing device 400 implementing data priority configuration according to an embodiment of the present disclosure. According to an embodiment, the computing device 400 may include at least one processor 402, where the processor 402 executes at least one computer readable instruction (namely, the above-mentioned element implemented in the form of software) stored or encoded in a computer readable storage medium (namely, the memory 404).

In an embodiment, the memory 404 stores computer executable instructions that, when executed, cause the at least one processor 402 to complete the following actions: determining a data type of received data; determining, based on the data type, a priority description used to describe a priority of the data; and computing the priority of the data based on the priority description of the data.

It should be understood that the computer executable instructions stored in the memory 404, when executed, cause the at least one processor 402 to perform various operations and functions described above in conjunction with FIGS. 1 to 3 in the embodiments of the present disclosure.

According to an embodiment, a non-transitory machine readable medium is provided. The non-transitory machine readable medium may have machine executable instructions (namely, the above-mentioned element implemented in the form of software) that, when executed by a machine, cause the machine to perform various operations and functions described above in conjunction with FIGS. 1 to 3 in the embodiments of the present disclosure.

According to an embodiment, a computer program is provided, which includes computer executable instructions that, when executed, cause at least one processor to perform various operations and functions described above in conjunction with FIGS. 1 to 3 in the embodiments of the present disclosure.

According to an embodiment, a computer program product is provided, which includes computer executable instructions that, when executed, cause at least one processor to perform various operations and functions described above in conjunction with FIGS. 1 to 3 in the embodiments of the present disclosure.

Exemplary embodiments are described above in conjunction with the specific embodiments described in the accompanying drawings, but do not represent all the embodiments that can be implemented or fall within the protection scope of the claims. The term "exemplary" used throughout the specification means "used as an example, an instance or an illustration", but does not mean "preferred" or "advantageous" over the other embodiments. For the purpose of providing an understanding of the described technologies, the specific embodiments include specific details. However, the technologies can be implemented without the specific details. In some embodiments, in order to avoid causing difficulty in understanding the described concepts in the embodiments, commonly known structures and apparatuses are shown in the form of a block diagram.

The descriptions above of the present disclosure are provided to enable any person of ordinary skill in the art to implement or use the present disclosure. For those of ordinary skill in the art, various modifications made to the present disclosure are obvious and the general principles defined herein may also be applied to other variants without departing from the protection scope of the present disclosure. Therefore, the present disclosure is not limited to the examples and designs described herein, and corresponds to the widest scope in accordance with the principles and novel features disclosed herein.

The invention claimed is:

1. A method for configuring a data priority of data received from a plurality of Internet of Things (IoT) field devices on a cloud platform having at least one server, comprising:
   receiving data on the cloud platform from the plurality of IoT field devices, each IoT field device including a processor and memory;
   determining a data type of received data;
   selecting, based on the determined data type, a priority description used to describe a priority of the received data and storing the priority description in a configuration file on the server of the cloud platform;

computing, on the cloud platform, the priority of the received data based on the priority description of the received data;
setting a transmission bandwidth based on the priority description; and
delivering to the IoT field device, in a hierarchical order and based on the priority configured for the data corresponding to an urgency level, an event extracted from the data to the IoT field device,
wherein the determining, based on the data type, of a priority description used to describe a priority of the data comprises:
searching a configuration file stored on the cloud platform for the priority description, the priority description corresponding to the data type, wherein the configuration file includes the data type and the priority description corresponding to the data type, and wherein the configuration file further includes a priority type corresponding to the data type, and the priority type includes a fixed priority, a conditional priority, and a combined priority, wherein a fixed priority indicates that the data has a fixed priority value, a conditional priority indicates that the data has different priority values in different cases and a combined priority indicates that when there are a number of events extracted from data happening at a same moment, a priority value of a priority is computed based on a priority value of each of the number of events.

2. The method as claimed in claim 1, wherein the received data comprises data acquired by field devices in different scenarios and uploaded to the cloud platform, and the configuration file comprises different configuration files set for the different scenarios.

3. The method as claimed in claim 2, wherein the different scenarios comprise device information of a factory, order information of a factory, a production status of a factory, a driverless car, a subcombination thereof or a combination thereof.

4. A computing device, comprising:
at least one processor; and
a memory coupled to the at least one processor, wherein the memory is configured to store instructions that, when executed by the at least one processor, cause the processor to perform the method as claimed in claim 3.

5. A computing device, comprising:
at least one processor; and
a memory coupled to the at least one processor, wherein the memory is configured to store instructions that, when executed by the at least one processor, cause the processor to perform the method as claimed in claim 2.

6. An information processing system, comprising:
at least one field device, the field device include a processor; and
a cloud platform including at least one server, wherein the field device acquires field data, and uploads the field data to the cloud platform, wherein the cloud platform is configured to perform the method of claim 1, the priority of the field data being the priority of the received data.

7. A computing device, comprising:
at least one processor; and
a memory coupled to the at least one processor, wherein the memory is configured to store instructions that, when executed by the at least one processor, cause the processor to perform the method as claimed in claim 1.

8. A non-transitory machine readable storage medium storing executable instructions that, when executed by a machine, cause the machine to perform the method as claimed in claim 1.

9. A computer program, comprising non-transitory computer executable instructions that, when executed by at least one processor, cause the at least one processor to perform the method as claimed in claim 1.

10. A computer program product tangibly stored on a computer-readable medium, and comprising computer executable instructions that, when executed by at least one processor, cause the at least one processor to perform the method as claimed in claim 1.

11. The method as claimed in claim 1, further comprising:
sorting a priority score computed for each piece of data received, and
extracting a required data result and a priority order, to organize a message/data queue to deliver the queue to a field device via a data transmission channel.

12. The method as claimed in claim 1, further comprising allocating transmission bandwidth resources based on the priority type.

13. A cloud platform, comprising:
at least one server having at least one processor;
a data receiver configured to receive data from a plurality of Internet of Things (IoT) devices, each IoT device including a processor, and determine a data type of the received data; wherein the at least one processor is configured to
determine, based on the data type, a priority description used to describe a priority of the received data and storing the priority description in a configuration file on the server of the cloud platform; and
compute, on the cloud platform, the priority of the received data based on the priority description of the data;
set a transmission bandwidth based on the priority description; and
deliver to the IoT field device, in a hierarchical order and based on the priority configured for the data corresponding to an urgency level, an event extracted from the data to the IoT field device,
wherein the determining, based on the data type, of a priority description used to describe a priority of the data comprises:
searching a configuration file stored on the cloud platform for the priority description, the priority description corresponding to the data type, wherein the configuration file includes the data type and the priority description corresponding to the data type, and wherein the configuration file further includes a priority type corresponding to the data type, and the priority type includes a fixed priority, a conditional priority, and a combined priority, wherein a fixed priority indicates that the data has a fixed priority value, a conditional priority indicates that the data has different priority values in different cases and a combined priority indicates that when there are a number of events extracted from data happening at a same moment, a priority value of a priority is computed based on a priority value of each of the number of events.

14. The cloud platform as claimed in claim 13, further comprising:
a configuration file storage unit, wherein the configuration file storage unit stores a configuration file, and the configuration file includes the data type and the priority description, the priority description corresponding to the data type, and wherein the at least one processor is further configured to search the configuration file for the priority description corresponding to the data type.

15. The cloud platform as claimed in claim 14, wherein the configuration file further comprises a priority type corresponding to the data type, and the priority type comprises a fixed priority, a conditional priority, and a combined priority.

16. The cloud platform as claimed in claim 14, wherein the received data comprises data acquired by field devices in different scenarios and uploaded to the cloud platform, and the configuration file comprises different configuration files set for the different scenarios.

17. The cloud platform as claimed in claim 16, wherein the different scenarios comprise one or more of device information of a factory, order information of a factory, a production status of a factory, and a driverless car.

* * * * *